(12) United States Patent
Cheese

(10) Patent No.: US 7,228,571 B2
(45) Date of Patent: Jun. 12, 2007

(54) METHOD OF MAKING A HELMET

(75) Inventor: Martin Cheese, Newbold Verdon (GB)

(73) Assignee: NP Aerospace Limited (GB)

( * ) Notice: Subject to any disclaimer, the term of this patent is extended or adjusted under 35 U.S.C. 154(b) by 297 days.

(21) Appl. No.: 10/506,845

(22) PCT Filed: Mar. 4, 2003

(86) PCT No.: PCT/GB03/00913

§ 371 (c)(1),
(2), (4) Date: Sep. 3, 2004

(87) PCT Pub. No.: WO03/074962

PCT Pub. Date: Sep. 12, 2003

(65) Prior Publication Data

US 2005/0125881 A1   Jun. 16, 2005

(30) Foreign Application Priority Data

Mar. 6, 2002   (GB) .................... 0205267.8

(51) Int. Cl.
A42B 1/06 (2006.01)
B29D 31/00 (2006.01)
B29C 51/14 (2006.01)

(52) U.S. Cl. .................. 2/410; 264/152; 156/224; 156/260; 156/263; 442/134; 442/135

(58) Field of Classification Search .............. 2/412, 2/411, 410, 2.5, 6.6; 264/152; 156/224, 156/260, 263; 442/134, 135
See application file for complete search history.

(56) References Cited

U.S. PATENT DOCUMENTS 1,770,376 A * 7/1930 Bullard ................... 2/410
1,835,883 A * 12/1931 Lewis .................... 2/412
1,912,931 A * 6/1933 Clay ...................... 264/137
2,448,114 A * 8/1948 Olson et al. ............ 156/189
2,451,483 A   10/1948 Goldsmith
2,510,215 A * 6/1950 Butterfield et al. ...... 156/224
2,532,442 A * 12/1950 Daly ...................... 2/412
2,610,322 A * 9/1952 Daly ...................... 2/412
2,718,583 A * 9/1955 Noland et al. ........... 392/458
2,746,049 A * 5/1956 Hudson ................... 2/412
2,956,916 A * 10/1960 Voss et al. ................ 2/412

(Continued)

FOREIGN PATENT DOCUMENTS

DE   3806204 A1 *  9/1989

(Continued)

OTHER PUBLICATIONS

English Abstract of DE 19944164 A1 from esp@cenet, Jun. 2000.

Primary Examiner—Rodney M. Lindsey
(74) Attorney, Agent, or Firm—Howson & Howson LLP

(57) ABSTRACT

A method of making a helmet comprises the steps of cutting a plurality of substantially rectangular, preferably square, blanks from a sheet of resin-impregnated fabric, making curved cuts (1) in each blank to form a crown portion (5) and lobe portions (3) therefrom, arranging a stack of said sheets into a helmet preform such that the lobe portions of any blank partially overlap adjacent lobe portions of the same blank, and molding the helmet from the preform.

17 Claims, 3 Drawing Sheets

U.S. PATENT DOCUMENTS

| | | |
|---|---|---|
| 2,964,442 A | 12/1960 | Hansen |
| 3,300,357 A * | 1/1967 | Doerfling .................. 156/211 |
| 3,582,990 A | 6/1971 | Frieder |
| 3,956,447 A * | 5/1976 | Denommee et al. ........ 264/135 |
| 4,199,388 A * | 4/1980 | Tracy et al. ................ 156/166 |
| 4,309,487 A * | 1/1982 | Holmes ..................... 428/516 |
| 4,550,044 A * | 10/1985 | Rosenberg et al. ......... 428/101 |
| 4,596,056 A * | 6/1986 | Grick ............................ 2/412 |
| 4,656,674 A * | 4/1987 | Medwell ........................ 2/410 |
| 4,778,638 A | 10/1988 | White ......................... 264/152 |
| 4,908,877 A * | 3/1990 | White ............................ 2/412 |
| 4,953,234 A * | 9/1990 | Li et al. ........................ 2/412 |
| 4,990,207 A | 2/1991 | Sakai et al. ................. 156/242 |
| 5,112,667 A * | 5/1992 | Li et al. ...................... 428/113 |
| 6,012,178 A * | 1/2000 | Schuster et al. ............... 2/412 |
| 6,183,834 B1 * | 2/2001 | van der Loo ............... 428/107 |
| 2005/0125881 A1 * | 6/2005 | Cheese ........................... 2/410 |

FOREIGN PATENT DOCUMENTS

| | | |
|---|---|---|
| DE | 19944164 A1 | 6/2000 |
| FR | 1092605 | 4/1955 |
| FR | 2697626 A1 * | 5/1994 |
| GB | 2098852 A | 12/1982 |
| GB | 2196833 A | 5/1988 |
| JP | 61137712 A * | 6/1986 |

* cited by examiner

METHOD OF MAKING A HELMET

BACKGROUND TO THE INVENTION

This invention relates to a method of making a ballistic protective helmet and to a helmet made by the method.

Composite helmets have conventionally been made from strong fabric impregnated with a phenolic resin and cut into a hexagonal or octagonal shape called a pinwheel. Straight radial cuts are made such that the pinwheel comprises a crown from which radiates a plurality of straight-edged petals. A number of pinwheels are superposed by placing the crowns of the pinwheels on top of one another so that their petals are in a staggered relationship. The preform which results is placed in a heated mold, comprising matched steel dies, in a compression press and is subjected to heat and pressure to form the helmet.

In making the pinwheels, much fabric is cut to waste. This is a very significant disadvantage in view of the fact that the preferred fabrics comprise aramid fibers, such as "Kevlar"® sold by DuPont, and are expensive. At present there is also a world shortage, particularly of the higher grades (i.e. the strongest) aramid fibers.

The speed of the cutting procedure described above is limited by the fact that many cuts have to be made in different directions.

SUMMARY OF THE INVENTION

With the aim of significantly reducing waste relative to the conventional method and at the same time producing a stronger helmet, the present invention provides a method of making a helmet comprising the steps of cutting a plurality of substantially rectangular blanks from a sheet of fabric, making cuts in each blank to form a crown portion and lobe portions therefrom, arranging a stack of said sheets into a helmet preform such that the lobe portions of any blank partially overlap adjacent lobe portions of the same blank, and molding the helmet from the preform.

Rectangular blanks tessellate, thus wasting no material at all in the cutting steps, and speeding up the cutting steps as compared with the known blanks. Starting from a sheet of material with a straight edge, only three cuts are required to form four square blanks.

Preferably, the method includes the use of fabric previously impregnated with resin, preferably phenolic resin. We prefer to use fabric to which the resin has been added as an adhesive film. Alternatively, the resin could be added during the molding step.

Most preferably, the rectangular blanks are substantially square. The cutting process can be speeded up even further by forming only one cut extending inwardly from each side of each blank, thus forming only four lobe portions from the blank.

Preferably, the cuts in the blank are curved. In particular, the cuts preferably start at a position on each side of the blank which divides the side into two fractions of between 0.3/0.7 and 0.45/0.55. Each cut then preferably follows an arc of a circle towards that other side of the blank to which the cut is already closest. The cuts preferably do not extend further than any perpendicular bisector of any side of the blank: in a particular embodiment, the cuts terminate at the first perpendicular bisector reached.

We have discovered that by forming such curved cuts, the arranging step, which preferably comprises pushing the stack of blanks into a substantially hemispherical cavity, requires very little force as the lobe portions of each blank close up and partially overlap somewhat like the iris of a camera.

Preferably, the centers of the blanks in the stack are aligned and there is an angular offset between adjacent blanks. The invention makes it possible to use fewer blanks than the prior art process. Advantageously, the blanks are of more than one size, smaller blanks providing additional layers in the crown region of the helmet.

The blanks may have a thickness between 0.3 and 1 mm.

Preferably, the molding step involves the application of heat as well as pressure. This causes a flow of some of the resin down towards the rim of the helmet. However, the curved cuts divert the flow of resin to a horizontal direction around the helmet and the final distribution of resin is more even than in prior art helmets.

Preferably, the molded helmet is trimmed in order to form a helmet with a rim that lies substantially in one plane.

The invention also provides a helmet formed from a stack of fibrous blanks impregnated with resin, each blank comprising a trimmed rectangle and each blank having four curved cuts extending inwardly, one from each side of the rectangle.

BRIEF DESCRIPTION OF THE DRAWINGS

In order that the invention may be more readily understood, reference will now be made, by way of example only, to the accompanying drawings, in which.

DETAILED DESCRIPTION OF THE PREFERRED EMBODIMENTS

Figure 1:
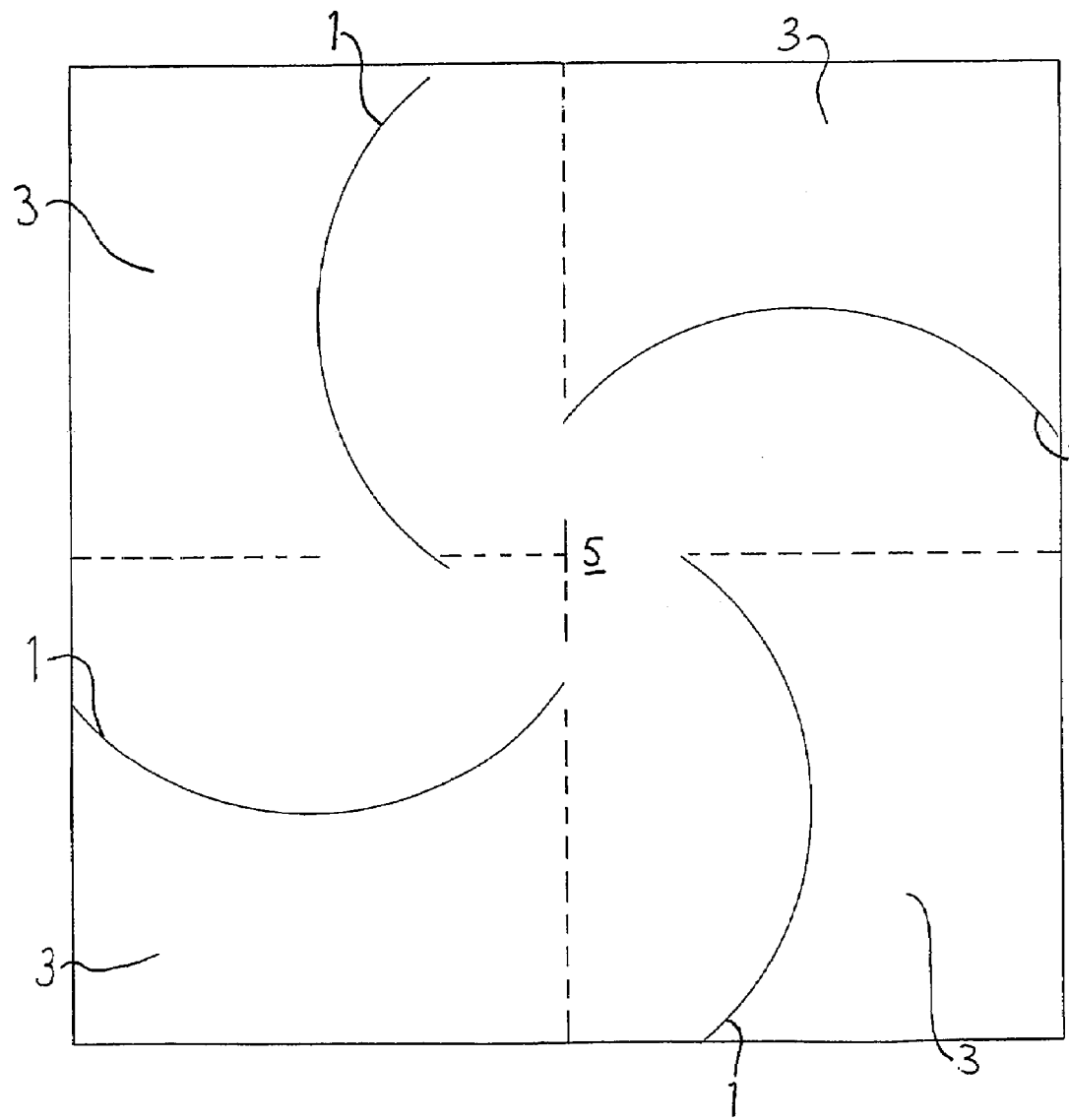
FIG. 1 shows a large cut blank for use in making a helmet according to an embodiment of the invention.

FIG. 1 shows a square blank of side 0.5 m cut from a strong woven fabric that has been impregnated with phenolic resin. Positions on the blank will be considered as Cartesian coordinates, with the bottom left-hand corner of the blank at the origin and the length of each side being one unit. Four cuts 1 are formed, starting from the points (0.375, 0), (1, 0.375), (0.625, 1) and (0, 0.625). The cuts are arcs of circles centered about the points (0.6875, 0.25), (0.75, 0.6875), (0.3125, 0.75) and (0.25, 0.3125) respectively. The cuts terminate at the points (0.375, 0.5), (0.5, 0.375), (0.625, 0.5) and (0.5, 0.625) respectively, i.e. at the first perpendicular bisector of any side of the blank reached (shown dotted).

This divides the blank into four lobe portions 3 and a crown portion 5.

Figure 2:
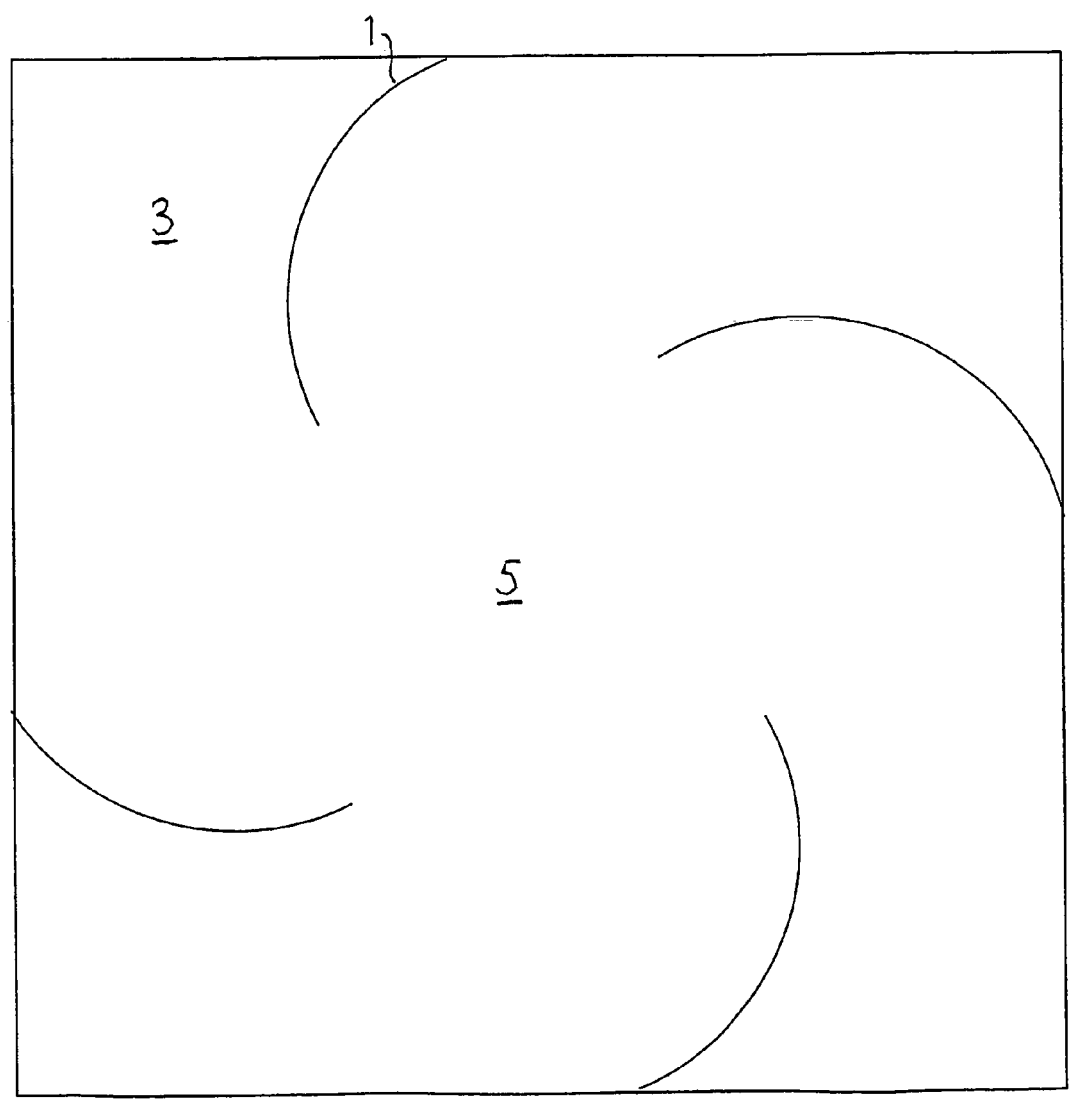
FIG. 2 shows a small cut blank for use in making the same helmet.
Figure 3:
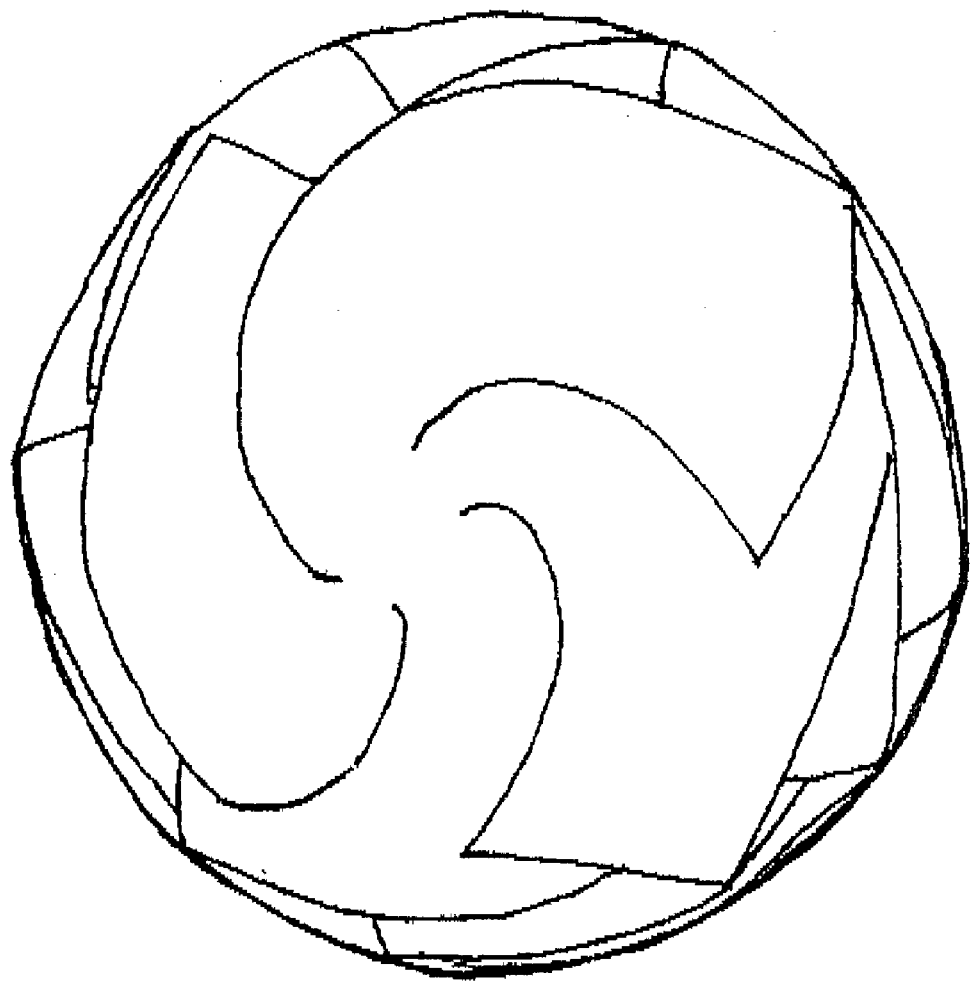
FIG. 3 is a plan view of a helmet according to the present invention.

FIG. 2 shows a square blank of side 0.25 m, in which four cuts are made, similar to those of the blank of FIG. 1 but shorter.

A stack of blanks alternating between the blanks of FIG. 1 and those of FIG. 2, for example comprising five or seven of each type, is arranged in a stack with the centers of the blanks aligned. Each subsequent blank of the same type is rotated by a predetermined angle with respect to the previous blank. The predetermined angle should not be close to 90° or 180°. For evenness of material it is preferred that the product of the predetermined angle and the number of blanks of a given type in the stack is approximately 360° or a multiple of 360°. In a particular example, each blank is rotated by 55° with respect to the previous blank.

In order to form a generally hemispherical helmet preform, the stack of blanks is pushed into a concave cavity having a part-spherical surface. In doing so, the lobe portions 3 ride over the adjacent lobe portions of the same blank This is achieved with remarkably little pushing force. The smaller blanks of FIG. 2 provide additional layers at the crown portion of the preform, whilst the overlapping lobe portions 3 of the larger blanks of FIG. 1 provide additional layers nearer the rim of the preform.

The helmet preform may be preheated and is then taken to a mold comprising a convex lower molding tool and a concave upper molding tool and is formed into a desired helmet shape by pressing the tools together and heating to a temperature of approximately 140 to 160° C. for about 10 to 15 minutes. The curved cuts 1 in each blank cause the resin to flow around the helmet horizontally thus giving a sufficiently even final distribution of resin.

It will be appreciated that the square shape of the blanks causes unwanted triangular portions thereof to project from the side of the helmet. However, the unwanted portions are remarkably small and can easily be trimmed from the helmet after molding. Subsequently, the helmet has holes drilled therein and is painted and fitted with a cradle.

The resistance to impact of helmets according to the invention is more predictable than prior art helmets, because the amount by which adjacent lobes overlap is predictable. The V50 value, that is the velocity of projectiles stopped 50% of the time, by the helmet, is higher than prior art helmets at the same given weight.

Whilst the figures show two particular embodiments of resin-impregnated blanks, it should be understood that different configurations also fall within the scope of the appended claims. In particular, the size of the crown portion 5 of the blank can be made smaller, for a taller, narrower helmet, or larger, for a wider, shallower helmet. In one example, as well as the blanks shown in FIGS. 1 and 2, further square blanks of side 0.2 m are also used and the blanks are stacked in a sequence comprising one blank of each of the three sizes, which sequence is repeated several times. Four or more differently sized blanks could alternatively be used in making a helmet according to the invention.

The invention claimed is:

1. A method of making a helmet comprising the steps of cutting a plurality of substantially rectangular blanks from a sheet of fabric, making curved cuts in each blank to form a crown portion and lobe portions therefrom, arranging a stack of said sheets into a helmet preform by pushing the stack of blanks into a substantially hemispherical cavity so as to cause the lobe portions of each blank to partially overlap adjacent lobe portions of the same blank, and molding the helmet from the preform.

2. A method according to claim 1, wherein the sheet of fabric has previously been impregnated with resin.

3. A method according to claim 2, wherein the resin is phenolic resin.

4. A method according to claim 3, wherein the rectangular blanks are substantially square.

5. A method according to claim 4, wherein the step of making cuts comprises forming only one cut extending inwardly from each side of each blank, thus forming only four lobe portions from the blank.

6. A method according to claim 1, wherein the rectangular blanks are substantially square.

7. A method according to claim 1, wherein the step of making cuts comprises forming only one cut extending inwardly from each side of each blank, thus forming only four lobe portions from the blank.

8. A method according to claim 1, wherein the cuts start at a position on each side of the blank which divides the side into two fractions of between 0.3/0.7 and 0.45/0.55.

9. A method according to claim 8, wherein each cut then follows an arc of a circle towards the other side of the blank to which the cut is already closest.

10. A method according to claim 9, wherein the cuts do not extend further than any perpendicular bisector of any side of the blank.

11. A method according to claim 10, wherein each cut terminates at the first perpendicular bisector reached.

12. A method according to claim 1, wherein the centers of the blanks in the stack are aligned and there is an angular offset between adjacent blanks.

13. A method according to claim 1, wherein the blanks are of more than one size.

14. A method according to claim 1, wherein the blanks have a thickness between 0.3 and 1 mm.

15. A method according to claim 1, wherein the molding step involves the application of heat as well as pressure.

16. A method according to claim 1, wherein the molded helmet is trimmed in order to form a helmet with a rim that lies substantially in one plane.

17. A helmet formed from a stack of fibrous blanks impregnated with resin, each blank comprising a trimmed rectangle and each blank having four curved cuts extending inwardly, one from each side of the rectangle.

* * * * *